United States Patent [19]

Hesnan

[11] Patent Number: 5,639,977

[45] Date of Patent: Jun. 17, 1997

[54] MUSIC LEARNING AID

[76] Inventor: John Hesnan, Derryloughlaun East, Furbo, Spiddal, Co. Galway, Ireland

[21] Appl. No.: 605,358

[22] Filed: Feb. 22, 1996

Related U.S. Application Data

[62] Division of Ser. No. 347,387, Dec. 5, 1994, Pat. No. 5,524,522.

[30] Foreign Application Priority Data

Jun. 3, 1992 [IE] Ireland ................................. 921789

[51] Int. Cl.$^6$ ................................................ G09B 15/02
[52] U.S. Cl. ................................. 84/477 R; 84/485 R
[58] Field of Search ................... 84/470 R, 477 R, 84/478, 485 R

[56] References Cited

U.S. PATENT DOCUMENTS

| | | | |
|---|---|---|---|
| 2,832,252 | 4/1958 | Gabriel | 84/480 |
| 2,941,436 | 6/1960 | Ericksen | 84/473 |
| 3,678,796 | 7/1972 | Puopolo | 84/471 |
| 3,728,930 | 4/1973 | Maron | 84/471 |
| 3,728,931 | 4/1973 | Leonard | 84/471 |
| 4,366,741 | 1/1983 | Titus | 84/478 |
| 4,412,473 | 11/1983 | Laflamme | 84/485 |
| 4,779,510 | 10/1988 | Van Den Abbeel | 84/464 R |
| 5,400,687 | 3/1995 | Ishii | 84/477 R |

*Primary Examiner*—Cassandra C. Spyrou
*Attorney, Agent, or Firm*—Jacobson, Price, Holman & Stern, PLLC

[57] ABSTRACT

A music learning aid has a base and a sliding template. The template has windows which allow viewing of the musical information imprinted on the base at different positions. Each position is selected by being able to view a keynote through a window so that the cut-out slots in the template then show the musical information for that keynote and scale or chord. The musical information may include the musical notation and the musical instrument playing instructions. In another embodiment, a learning aid takes the form of an electronic calculator where different information sets may be displayed on a liquid crystal display according to instructions inputted on a keypad.

4 Claims, 9 Drawing Sheets

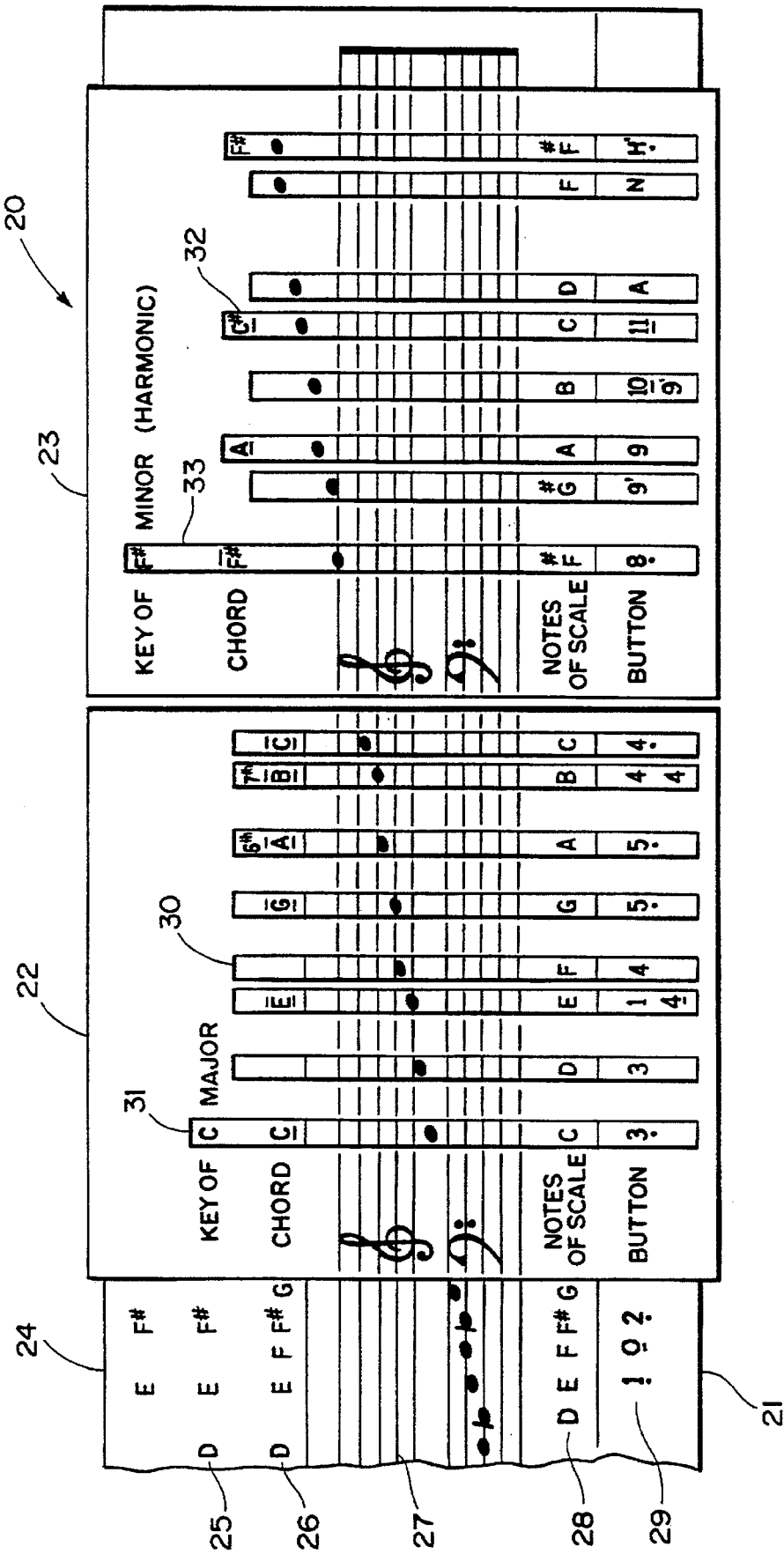

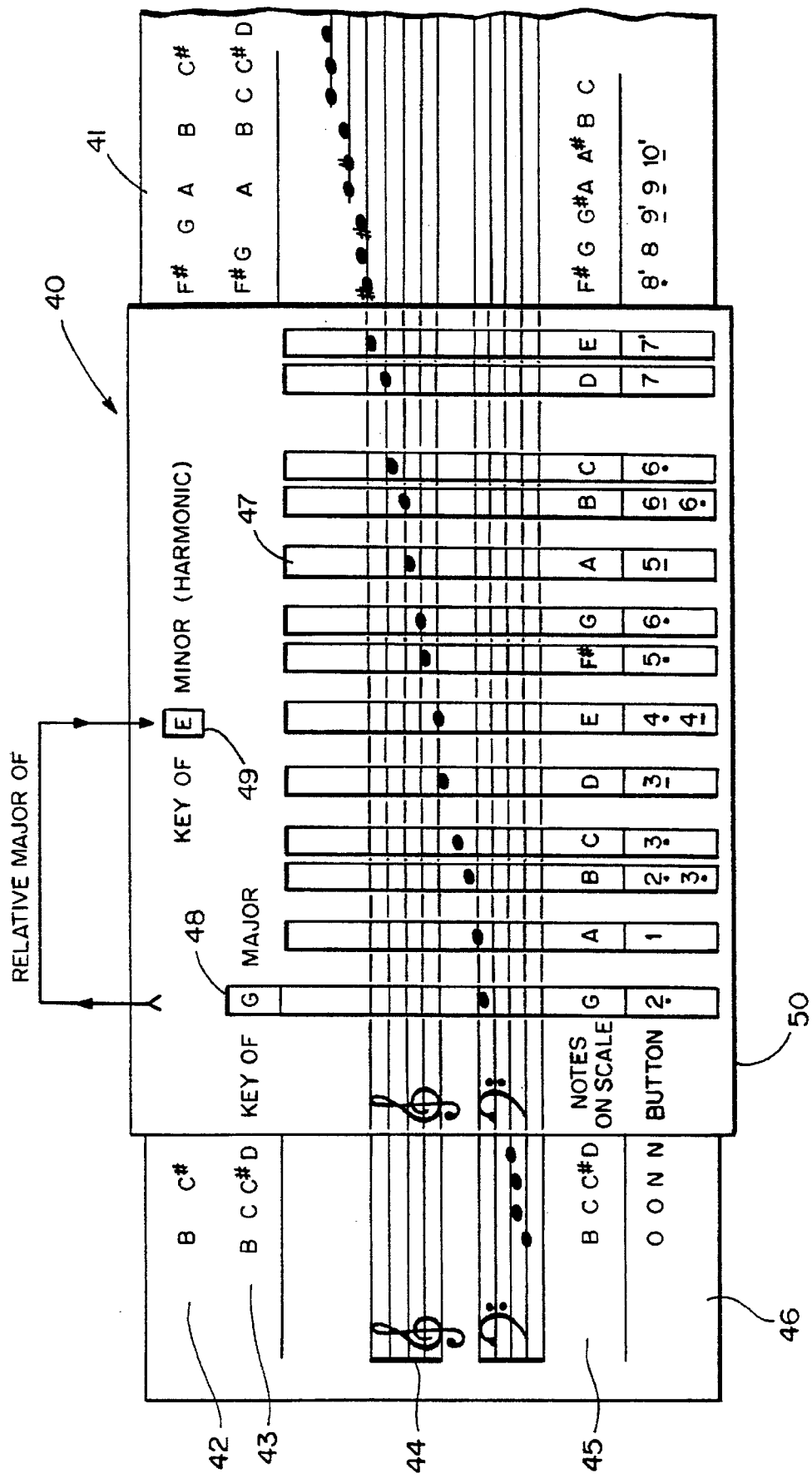

MUSIC LEARNING AID

This is a divisional of application Ser. No. 08/347,387 filed Dec. 5, 1994 now U.S. Pat. No. 5,524,522.

BACKGROUND OF THE INVENTION

The invention relates to a music learning aid. In this specification, the term "learning aid" means not only learning but also teaching whereby the aid my be used as an aid for teaching or for learning. In addition, the term "music" when used in this context means music theory or practice with reference to playing musical instruments.

Learning how to play a musical instrument involves a number of stages, one of the most difficult of which is memorizing how each note is produced on the instrument. The note, scale and chord conversions for the instrument must also be learned. The relationship between keys, buttons or strings of a particular instrument and their associated note name and staff position involves in-depth referral to a theoretical base in order to calculate scales and chords. Similar difficulties are also encountered by people learning music theory.

A music teaching aid is described in German patent specification No. DE 4002361 (Kuffer, P.). This comprises a display panel straddled by a slider, upon operation of which Major and Minor keynotes in alphabetic music notation are displayed for a selected fundamental. Accordingly, it appears that this aid would be of some benefit to skilled musicians in that it "calculates" Major and Minor scales for a particular keynote in alphabetic notation.

However, this teaching aid is apparently of little or no benefit to beginners or to moderate musicians in learning how to play instruments or learning music theory. There is still a requirement to refer to music books to obtain the necessary music theory information and information as to how to play the relevant musical instrument. In many cases this puts people off learning music.

SUMMARY OF THE INVENTION

It is an aim of the present invention to provide a device which will make it easier for a person to learn how to play a musical instrument while simultaneously learning music theory and/or to provide a device which assists a person in learning music theory only.

According to the invention, there is provided a music learning aid comprising:
 a music information storage bank; and
 a user interface having means for selecting and displaying information from the storage bank in at least two alignment directions, one direction displaying a scale or chord calculation, the other direction displaying additional scale or chord information for learning of music theory or instrument playing.

By providing for simultaneous display of both calculation and additional information in different alignment directions, the invention allows easy and enjoyable music theory or instrument playing learning.

In one embodiment, the calculation alignment direction is substantially horizontal, and the additional information direction is substantially vertical as viewed on the learning aid, in use.

Preferably, the scale or chord calculation information is in alphabetic or staff notation, and the additional information is in the other of the alphabetic or staff notation.

In another embodiment, the additional information comprises instrument playing instructions.

Ideally, staff position, note name and playing instructions for every note of the scale or chord are aligned in the additional information direction for correlation.

In a further embodiment, the aid comprises means for displaying numeric position of each note of the scale or chord.

In another embodiment, the aid comprises means for displaying tonic solfa of each note of the scale or chord.

In one embodiment, the information storage bank comprises a base member having the information imprinted thereon, and the user interface comprises a sliding template movable on the base member and being constructed to allow viewing of information in the alignment directions.

In this latter embodiment, the template preferably has a series of elongate slots together extending in the calculation alignment direction, the direction of each individual slot being in the additional information direction whereby each individual slot highlights a music note and correlated additional information.

Preferably, the base member has information imprinted on both sides and the template allows viewing on both sides.

Alternatively, the storage bank may be an electronic storage bank and the user interface comprises an electronic user input interface, an electronic control circuit and an electronic display unit for displaying with the information.

Preferably, the aid has a shape and configuration which allows it to be hand-held.

BRIEF DESCRIPTION OF THE DRAWINGS

The invention will be more clearly understood from the following description of some preferred embodiments thereof, given by way of example only with reference to the accompanying drawings in which:

FIG. 4 is a front view of portion of an alternative construction of learning aid;

FIG. 5 is a front view of portion of a still further construction of learning aid;

DESCRIPTION OF THE PREFERRED EMBODIMENTS

Figure 1:
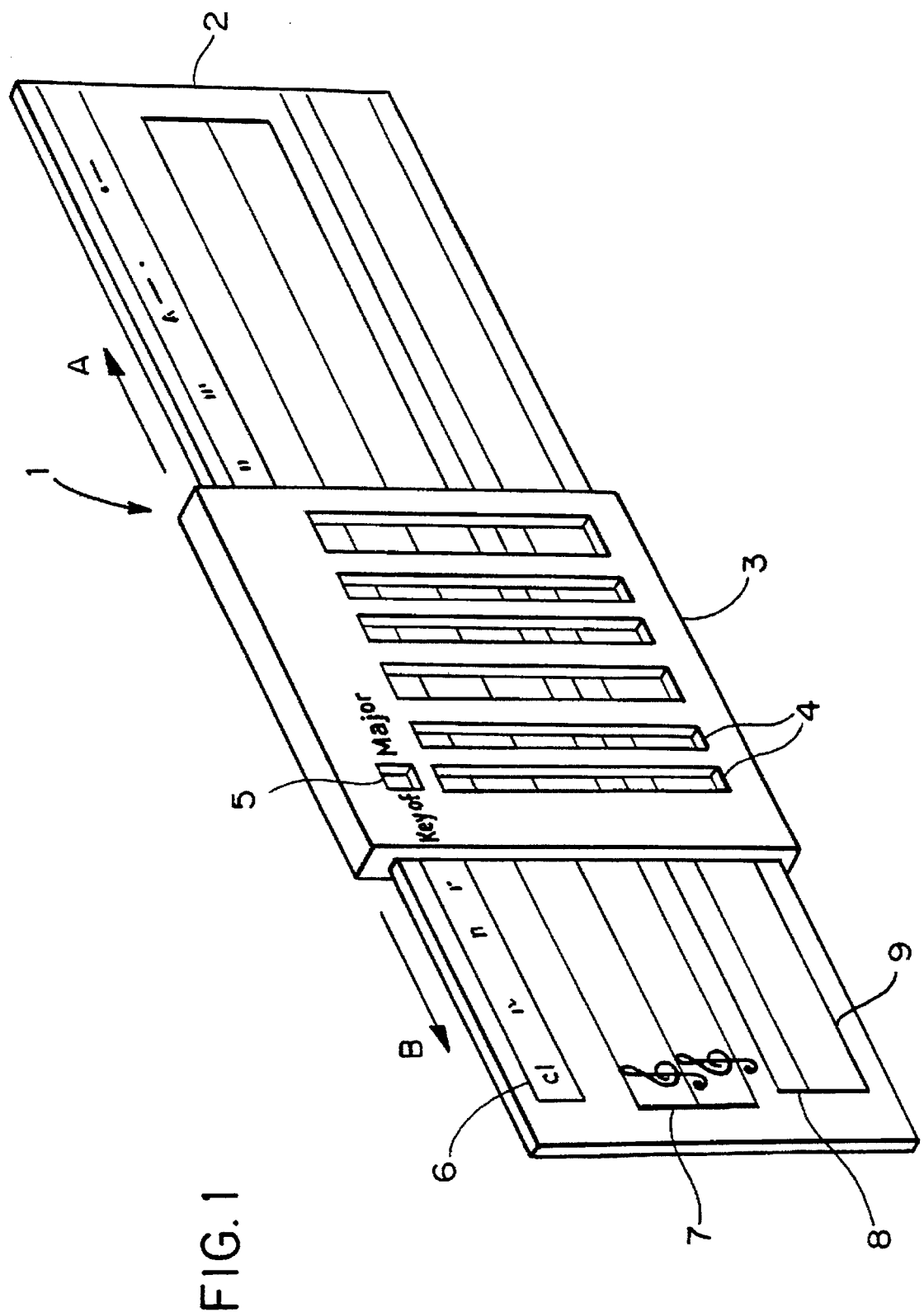
FIG. 1 is a perspective view from above of a learning aid of the invention.
Figure 2:
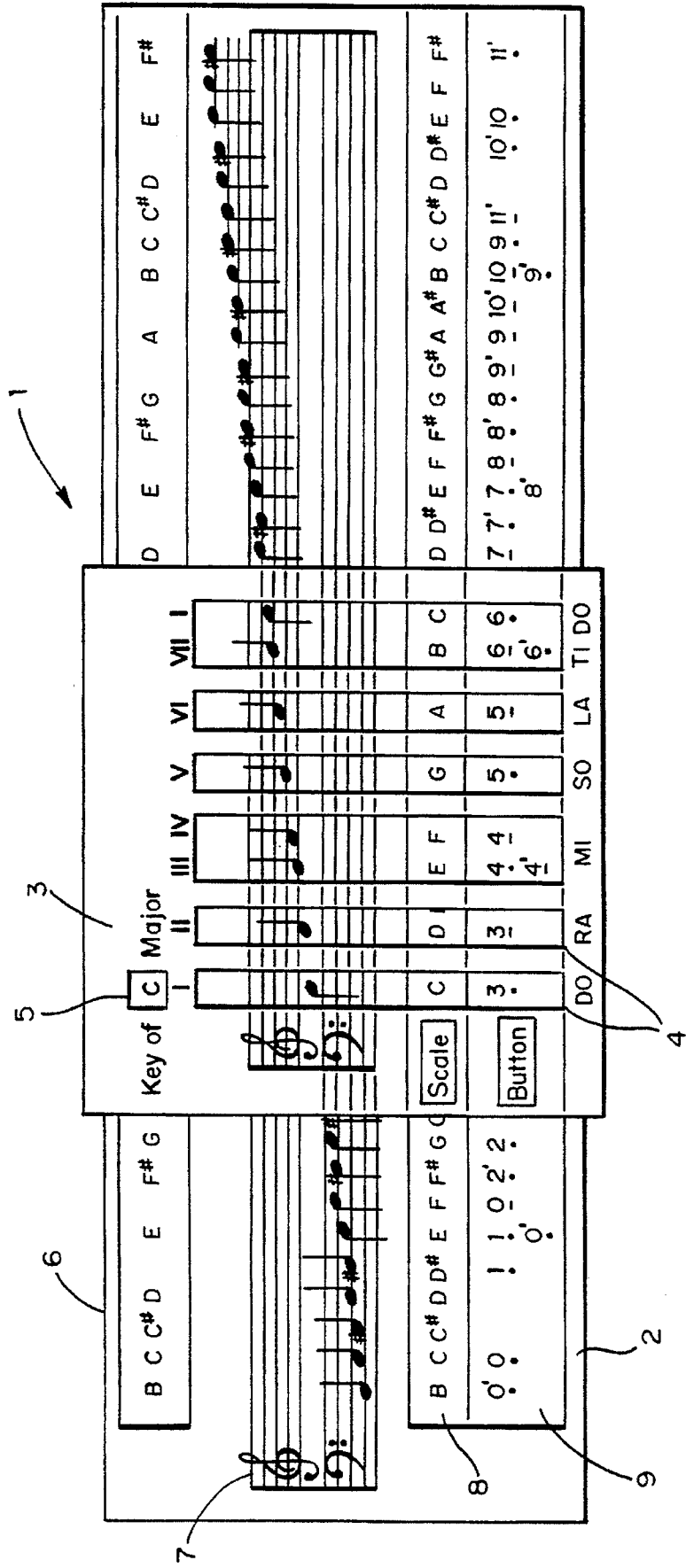
FIGS. 2 and 3 are front and rear views of the aid of FIG. 1, respectively.
Figure 3:
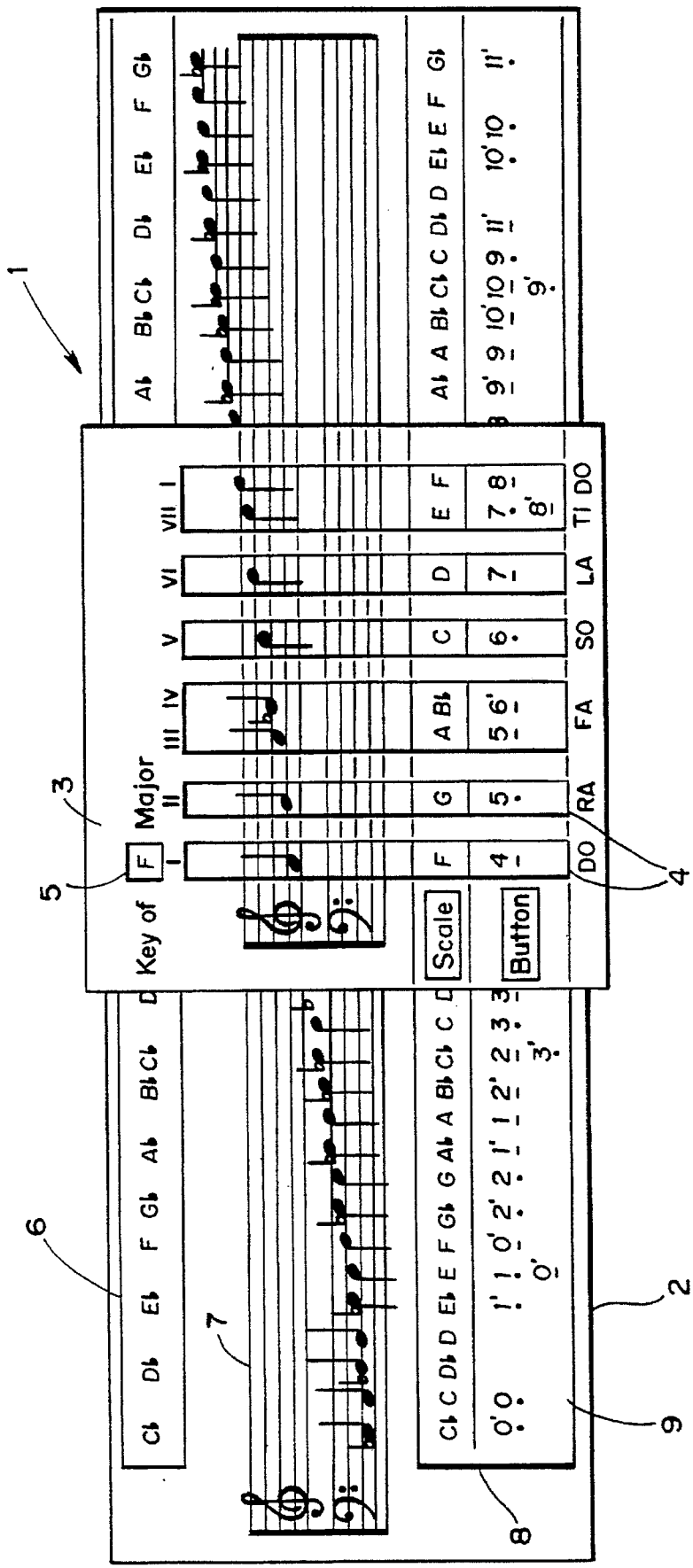

Referring to the drawings, and initially to FIGS. 1 to 3 inclusive, a learning aid of the invention indicated generally by the reference numeral 1 is shown. The aid 1 comprises a rectangular plate which forms a base 2 for the aid on which slides a cursor template 3 which surrounds both the front and rear faces of the base 2. The template 3 slides in a longitudinal direction, forwardly as indicated by the arrow A, and rearwardly as indicated by the letter B. The template 3 has a set of cut-out slots 4 which extend in the transverse direction with respect to the base 2. The slots 4 are of different widths, the reason for this being explained below. In addition, there is a keynote window 5 above the slots 4.

As shown in detail in FIGS. 2 and 3, the base 2 acts as a music information storage bank as it includes different categories of musical information imprinted on the front and rear of it. The template 3 acts as the user interface because it slides over the base 2 to highlight certain information. The uppermost category is a series of keynotes 6, one of which may be viewed at any one time through the window 5 in the template 3. A series of staff musical notation 7 is imprinted below the keynotes 6. There is a series of scale indicia 8, in which each scale letter is aligned with the corresponding piece of musical notation 7 by way of the slots in the templates. In turn, there is a series of musical playing instructions 9, each instruction being aligned with a note on the musical notation 7 and a scale letter 8. The instrument playing instructions 9 are in this embodiment for a two-row, B/C tuned button accordion, however, they may be for playing of any musical instrument in any tuning.

As shown in FIGS. 2 and 3, the cursor 3 is associated with the Major keys. However, there are other sets of cursors, not shown. One set is associated with Minor keys and scales, and the other with all of the chords available on the selected instrument.

In use, to determine and play a C Major scale, the user slides the template ("cursor") on the base 2 until the window 5 shows the C Major keynote. At this position, the slots 4 show a set of musical information which indicate how this scale may be played. This set of musical information includes the staff notation, the note names, and the instructions for playing the C Major scale on the button accordion. The scale is therefore "calculated" in the horizontal alignment direction in both staff notation and alphabetic notation. Very importantly, however, the vertical directions as highlighted by the slots 4 show additional information. For example, if the alphabetic "scale" is regarded as the calculation, the vertical alignment direction for each note shows the additional information of the staff notation and playing instructions. For example, if one wishes to play a tune, the learning aid 1 may be used by simply lining up the cursor with the key the tune is in and writing out each note in button notation (from the melody). The tune may then be played immediately provided the user has the air or a recording. Scales may of course be calculated for every octave available in the instrument.

FIG. 2 shows the front face of the learning aid 1 on which the base has the sharp scales imprinted on it, FIG. 3 showing the rear face on which the flat scales are imprinted. Thus, it will be clearly apparent that the learning aid 1 is extremely versatile and useful.

It will be appreciated that the learning aid 1 is extremely versatile and provides for immediate information for the user for both music theory learning and also musical instrument playing. The combination of calculation information in one alignment direction and additional information about the scale or chord provides the advantageous feature of greatly helping in learning of music theory or playing. In addition, the aid 1 may be used in teaching of music to students. A very important feature is the fact that a complete set of musical information which is required for certain purposes is immediately available to the user. Further, different sets of information may be very easily selected by simply moving the cursor until the required keynote is displayed in the window 6.

Many different variations within the scope of the invention are envisaged. For example, as shown in FIG. 4, there is a learning aid 20 which has a base 21 having a series of Minor key information 24, a series of Major key information 25 and a series of chord information 26. There is also a series of musical notation 27, scale information 28 and instrument playing information 29. In this embodiment there are two cursors 22 and 23, the cursor 22 having slots 30 for allowing viewing of chord, musical note, scale and instrument playing information, in which the first slot indicated by the numeral 31 also allows viewing of the Major keynote. The cursor 23 has a series of slots 32 in which alternate slots extend to a higher level to allow viewing of a separate chord information sequence 26 and there is a first slot 33 which allows viewing of the Minor keynotes. The slots of the cursor 23 allow viewing of musical note, staff, scale and instrument playing information for all harmonic Minor scales.

Referring to FIG. 5, there is shown a learning aid 40 comprising a base 41 having Minor keynote, Major keynote, musical notation, scale, and instrument playing information sequences 42, 43, 44, 45 and 46, respectively.

A template 50 has a set of slots 47 and an initial slot 48 which allows viewing of the Major keynote and scales. There is a separate window 49 for viewing of the minor keynotes. This cursor shows two sets of information, in which the Major keynote is the relative Major of the Minor keynote.

It will be appreciated that the learning aid of the invention may take many different forms in which the indicia which are imprinted on the base member may change, as shown in the above-mentioned drawings. In addition, he mechanical operation of the learning aid may be varied within the scope of the invention. For example, instead of having cut-out slots or windows, there may be tansparent sections of the template to allow viewing of The information. The base may be circular in shape, or indeed it may be cylindrical, in which the template is correspondingly shaped so that it may move on the base to highlight the information sets. The important point is that one alignment direction shows calculation information and another shows additional information to help in music theory or instrument learning. Those skilled in the art will immediately appreciate that many different shapes and configurations may be used.

Figure 6:
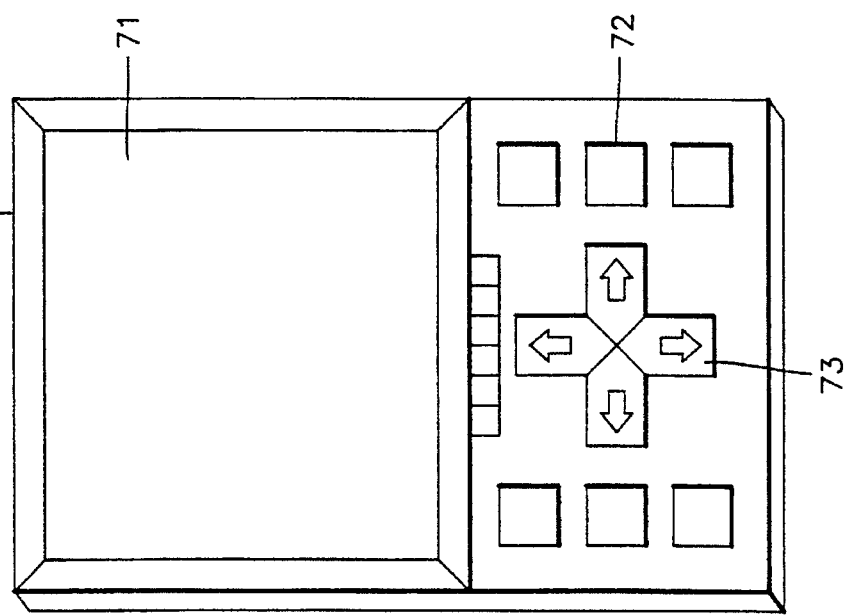
FIG. 6 is a perspective view of a still further construction of learning aid of the invention, in this case being electronically controlled.

Indeed, the invention is not limited to a mechanical apparatus for displaying and selecting musical information sets. For example, as shown in FIGS. 6 to 9 inclusive, an electronic hand-held device may be used instead. In FIG. 6, there is shown an electronic learning aid 70 having a liquid crystal display unit 71 and an input keypad 72. The unit 71 displays information in the same format as the mechanical embodiments. Programmed control circuits within the aid 70 allow a user choose the required information set using the keys 72. The keys 72 include arrow keys 73 to allow a user interactively select a required display in a "menu-driven" manner.

Figure 7:
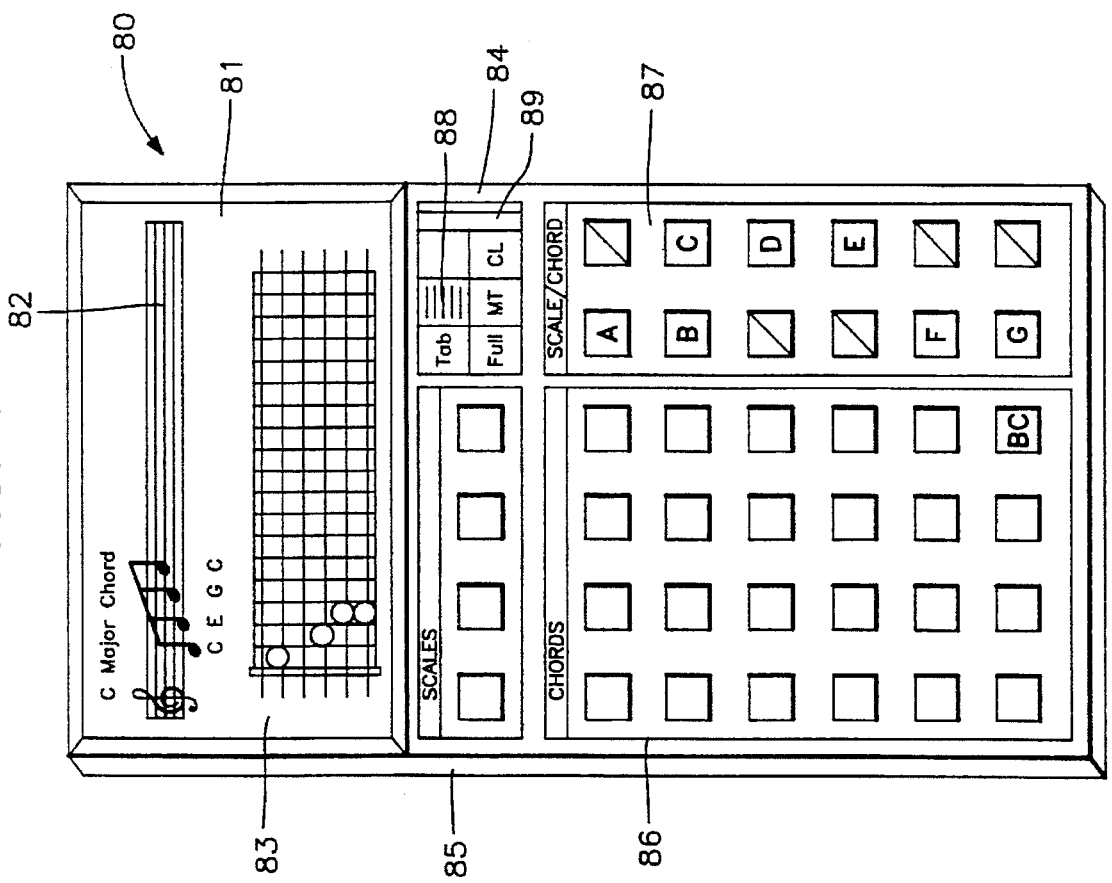
FIG. 7 is a perspective view of a still further construction of learning aid having electronic controls.

Referring now to FIG. 7, an alternative construction of an electronic learning aid of the invention is indicated generally by the reference numeral 80. The aid 80 has a user interface liquid crystal display unit 81 in which musical notation note names and keynotes 82 and playing instruction information 83 is shown being displayed. As is clear from the drawings, the horizontal direction shows staff and alphabetic notation calculations, the vertical alignment directions providing additional (instrument playing) information. The aid 80 includes various user interface keypad sections including a miscellaneous section 84, a scales section 85, a chords section 86 and a scale/chord section 87. The miscellaneous section 84 also includes a microphone 88 and a speaker 89.

Figure 8:
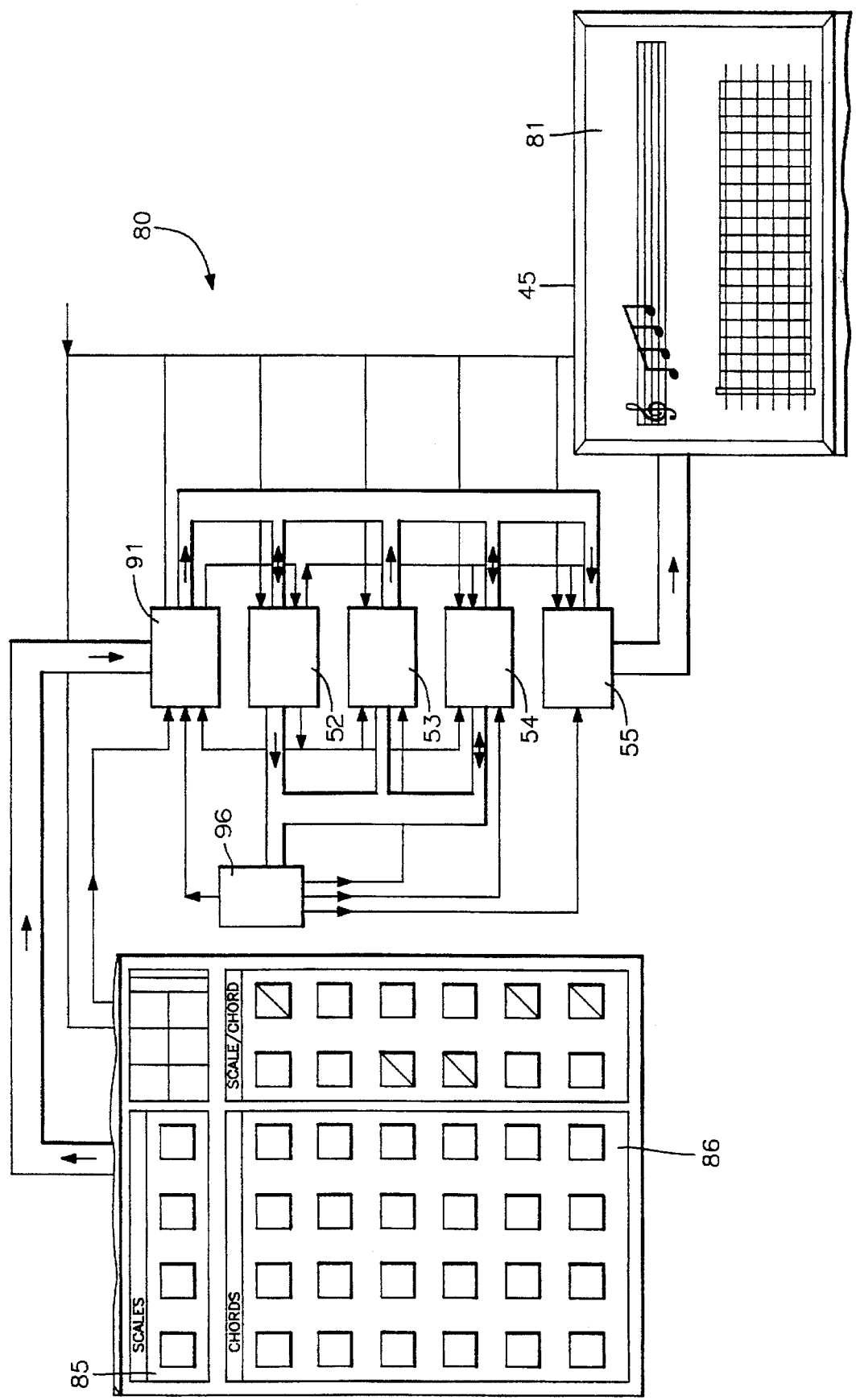
FIG. 8 is a circuit diagram showing construction of the learning aid of FIG. 7.

Referring now to FIG. 8, the learning aid 80 is shown in more detail. Control circuits of the aid 80 include a keyboard interface input/output port 91, a microprocessor 50, a read only memory 53 which in this embodiment is the music information storage bank. In addition, there is a random access memory 54, and a graphics display input/output port 55. An address decode circuit 96 is used in conjunction with the various circuits. The control circuits are programmed in the read only memory 53 to allow a user input instructions on the keypad to select a desired musical information set for display. The following example shows the manner in which the learning aid 80 may used. References are made in this description to the displays shown in FIGS. 9a to 9f.

The learning aid 80 which is illustrated is suitable for guitar tuition, however, it is envisaged that the aid may be programmed so that it can be used for instructions in a variety of different instruments, or indeed for any other single instrument, tuned in any key. The instant access feature (of all embodiments, both mechanical and electronic) of correlating scale/chord/note with their physical reproduction on any instrument while simultaneously displaying their musical notation (plus all features of music theory) is important. It allows a person with no knowledge of music theory or a musical instrument access to playing instructions and selected musical theory.

For a complete beginner to use the aid 80, he or she toggles the {B,C} key so that the fifteen easiest chords on the instrument may be displayed. This allows the beginner to have instant access to playing instructions and staff notation by simply pressing one key. In this example, the chords selected and displayed with playing instructions by toggling the B, C key are: E Major, E7, E Minor, A Major, A7, A Minor, D Major, D7, D Minor, C Major, C7, G Major, G7, B7 and F Major, in that order.

For people who are beyond the beginning stage, every chord (in all positions) and every scale (all octaves) can be selected and displayed with playing instructions using the teaching aid 80. In the following description the C Major chord and the C Major scale are selected and displayed. All other scales and chords may be selected and displayed with playing instructions using the same keyboard sequence and the relevant keys. In the case of FIG. 6, selection of information will be by way of an on-screen menu and arrow keys on the keypad.

As a first example, the following is the sequence of instructions for display (and subsequently playing) of the scale of C Major (two octaves).
Sequence
1. Turn the aid on with the {on/off} key.
2. Press key {C} in the "scale/chord" section 87 of the keyboard.
   (Note 1 : all the keys will be colour coded for simplicity so this instruction will read; e.g. Press Green key {C}.).
3. Press key {Major} in the "scales" section 85 of the keyboard.
   (First Octave; Reference FIG. 9a).
   (Note 2: e.g. Press Blue key {Major}.
4. Press key {Major} in the "scales" section 85 of the keyboard a second time.
   (Second Octave: Reference FIG. 9b)
   (Note 2: e.g. Press Blue Key {Major}.)
5. If the scales are required in Tablature format, pressing the-{TAB} key at this stage will give the Tablature equivalent in the display.
   (Reference FIG. 9f).
   Display Information (FIGS. 9a and 9b) When the scale is selected, the root note (in this case C) will be displayed on the staff and fingerboard and be highlighted. There will then be a pause between the display of each note on the staff and fingerboard so that the student can easily follow the playing sequence of the scale.

For both octaves the displays will show;
   The staff with treble clef in place, in the display section 82.
   The name of the scale chord selected; (in this case C Major).
   All the notes of the scale/chord in position on the staff.
   The numeric position/interval of each chord/scale.
   The key signature.
   The name of each note z the scale.
   A box grid in the display section 83 representing the strings and frets on the fingerboard of the guitar; the horizontal lines representing the strings, with high E (1st) at the top and the low E (6th) at the bottom. The vertical lines representing the frets are numbered to show what fingerboard location to use.
   Finger positions indicated by circles on the strings.
   A number in the circle to tell you which finger to use.
   Circles without numbers representing optional notes.
   Strings without a circle are played open.
   Strings with an x should not be played.

Figure 9A:
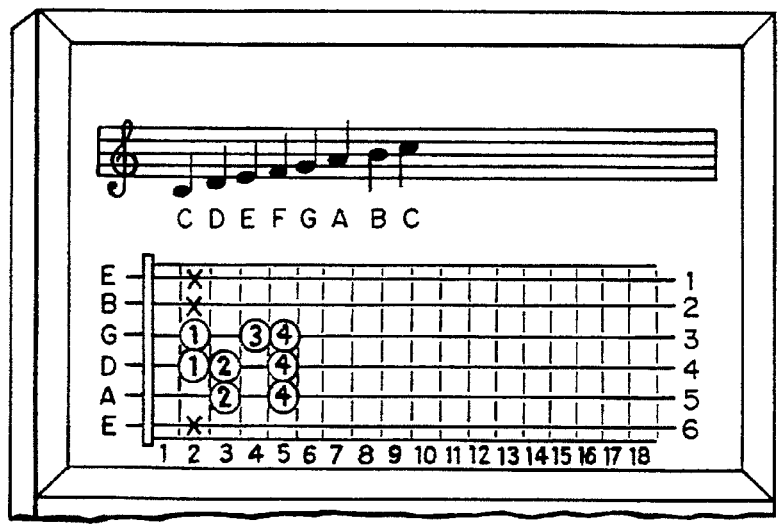
FIGS. 9a to 9f are front views showing different displays of the learning aid of FIG. 7.
Figure 9B:
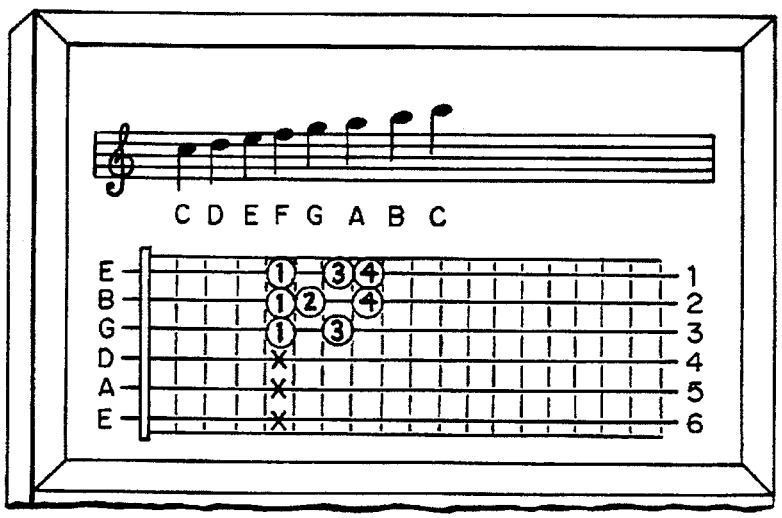
Figure 9C:
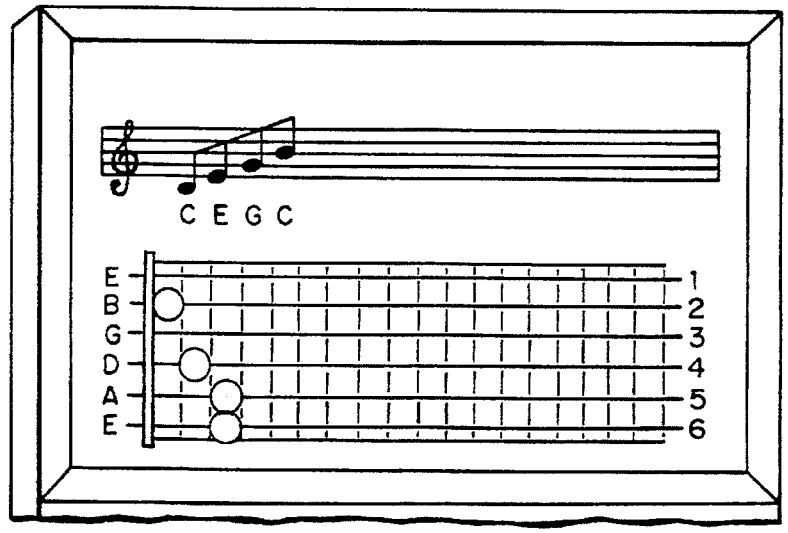
Figure 9D:
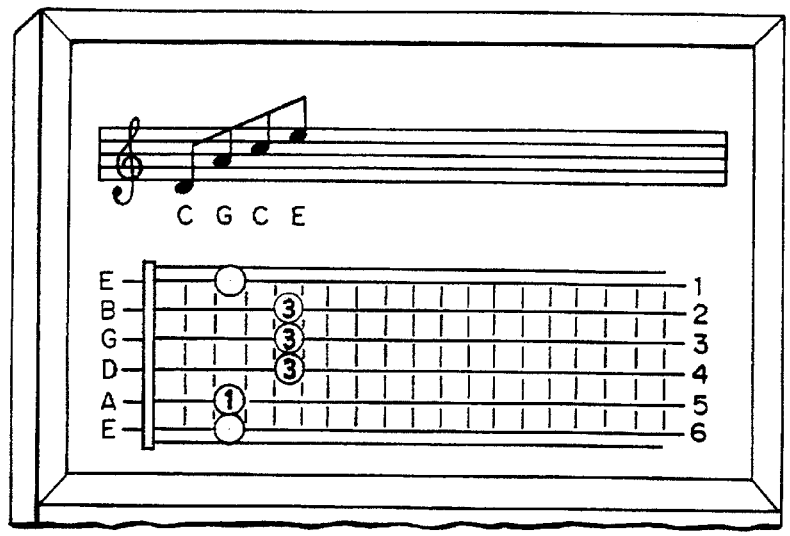
Figure 9E:
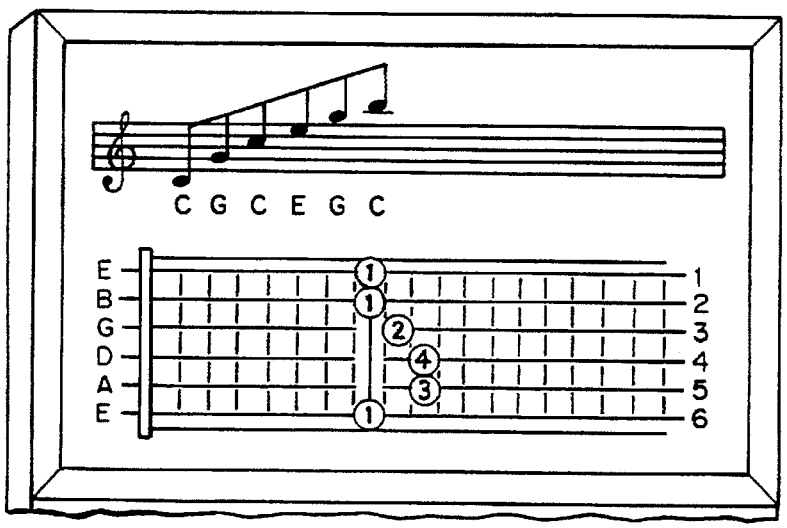
Figure 9F:
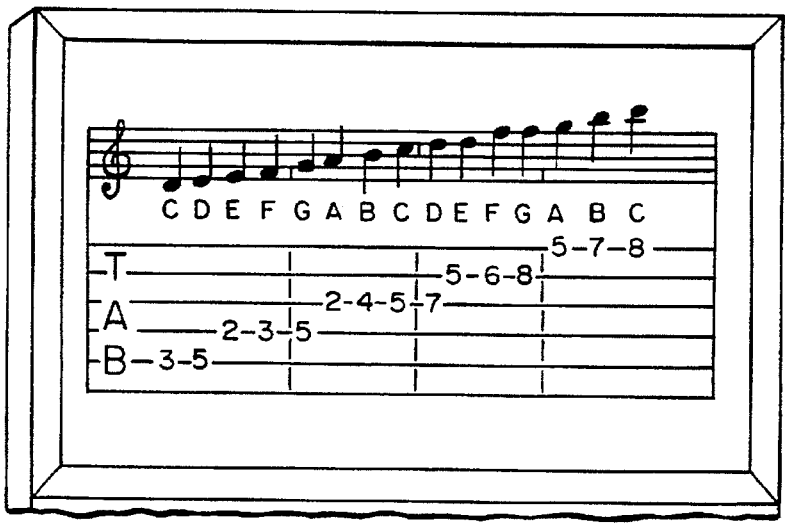

Using the above sequence by pressing the relevant keys, all of the Major and Minor scales can be selected and displayed on the aid 80 with detailed playing instructions and staff notation as shown in the displays of FIGS. 9a and 9b, thereby providing a comprehensive tutor for the beginner and also for the advanced student.

In another example, the aid 80 may be used to select and display the chord of C Major in three playing positions. The following is a sequence of inputs and a list of the displays.
Sequence
1. Turn the device on with the {on/off} key.
2. Press key {C} in the "scale/chord" section 87 of the keyboard.
3. Press key {Major} in the "chord" section 86 of the keyboard.
   (Note 3 : Press orange key {Major}).
   First Playing Position; Reference FIG. 9c.
4. Press key {Major} in the "chord" section 86 of the keyboard 41 a second time. (See Note 3).
   Second Playing Position; Reference FIG. 9d.
5. Press key {Major} in the "chord" section 86 of the keyboard 41 a third time. (See Note 3).
   Third Playing Position; Reference FIG. 9e.
6. If the chord selected is required in Tablature format, pressing the {TAB} key at this stage will show the tablature equivalent in the display.
   Display Information (FIGS. 9c, 9d, 9e) For each playing position the displays will show;
   The staff with treble clef in place.
   The name of the chord selected.
   The name of each note in the chore.
   The numeric position/interval of ease cord note.
   The notes of the chord in position on the staff.
   The key signature.
   A box grid representing the strings and frets on the fingerboard of the guitar; the horizontal lines representing the strings, with high E (1st) at the top and low E (6th) at the bottom vertical lines representing the frets are numbered to show what fingerboard location to use.

Finger positions indicated by circles on the strings.

A number in the circle to tell you which finger to use.

Circles without numbers representing optional notes.

Strings without a circle are played open.

Strings with an x should not be played.

Using the above sequence and by pressing relevant keys on the keypad, all of the chords may be selected (a minimum of 276 in three playing positions for the guitar) while displaying the accompanying playing instructions and staff notation, thereby providing a comprehensive tutor for the beginner to advanced player.

Additional features of the teaching aid 80 include the fact that all of the elements of music theory may be displayed using the (MT) key which when pressed will change the functions of all other keys.

The {Full} key will display all available notes on the fingerboard of the selected instrument, with associated staff notation.

The {TAB} key will display the tablature equivalent of every scale and chord selected. Tablature is a system of writing down music for the guitar and other fretted instruments. (Reference example given in FIG. 9f).

To find individual notes on the fingerboard, pressing the required key twice in the "scale/chord" 87 section will display all fingerboard positions of the selected note with associated staff notation and playing instructions.

The built-in microphone 88 can be used for tuning acoustic instruments, while a plug-in socket can be used for tuning electric instruments, with accompanying display (a feature of the {MT} key).

A tuning facility can also be available using the keyboard to select the note required. The built-in speaker 89 will sound the selected note(s). The speaker 89 can also be used to sound the selected chord(s).

A metronome feature can also be incorporated in the device.

All of the keyboard keys can be multifunctional dependant on the information required and they can also be toggled in different modes to step through various displays. This device can also be used for transposing music.

The invention provides a device which provides an instant, automatic, foolproof method of correlating all scales/chords/single notes with their physical reproduction on any instrument tuned in any key, while simultaneously displaying the musical notation associated with the scale, chord or note. It automatically calculates scale and chord intervals and simultaneously provides additional information so that it takes the complexity out of musical instrument playing and theory learning.

The invention is not limited to the embodiments hereinbefore described. For example, in the electronic teaching aid it is envisaged that a microprocessor control circuit may not be used. Further, it is envisaged that a relatively simple logic circuit could be used where there are few displays required and such a teaching aid would be extremely inexpensive. It is envisaged that the invention may be implemented by software running on PC or other computer. It is also envisaged that the mechanical embodiment may be Braille indicia for use by blind people.

The invention is not limited to the embodiments hereinbefore described but may be varied in construction and detail.

I claim:

1. A music learning and instrument playing aid comprising:

a display device;

a programmable controller; and a user interface, wherein the controller is programmed to automatically generate display of musical note calculations on staff lines extending in a calculation direction, and display of additional information including playing instructions associated with the musical notes, the additional information being displayed in transverse alignment with the associated musical notes in an additional information direction.

2. The aid as claimed in claim 1, wherein the display device is a single liquid crystal display having dimensions sufficient to allow viewing of calculations in the calculation direction and of the additional information in the additional information direction.

3. The aid as claimed in claim 1, wherein the controller is programmed to generate displays for a plurality of different musical instruments.

4. The aid as claimed in claim 1, wherein the controller comprises a read only memory circuit which stores musical information.

* * * * *